United States Patent [19]

Hunger et al.

[11] 4,287,122

[45] Sep. 1, 1981

[54] MONOAZO COMPOUNDS FROM 1-AMINOBENZENE-2-CARBOXYLIC ACID DERIVATIVES AND THEIR USE AS COLORANTS

[75] Inventors: Klaus Hunger; Ernst Klappert, both of Kelkheim; Konrad Löhe, Rembrücken, all of Fed. Rep. of Germany

[73] Assignee: Hoechst Aktiengesellschaft, Frankfurt am Main, Fed. Rep. of Germany

[21] Appl. No.: 772,268

[22] Filed: Feb. 25, 1977

[30] Foreign Application Priority Data

Feb. 27, 1976 [DE] Fed. Rep. of Germany ....... 2607965

[51] Int. Cl.[3] .............. C09B 29/20; D06P 1/44; D06P 1/90
[52] U.S. Cl. ...................................... 260/203; 106/23; 106/288 Q; 162/162; 260/208
[58] Field of Search ................... 260/203; 106/288 Q

[56] References Cited

U.S. PATENT DOCUMENTS

| | | | |
|---|---|---|---|
| 2,208,363 | 7/1940 | Fischer | 260/203 |
| 3,113,938 | 12/1963 | Nakaten et al. | 260/204 |
| 3,321,458 | 5/1967 | Lohe et al. | 260/203 |
| 3,336,288 | 8/1967 | Stocker et al. | 260/203 |

FOREIGN PATENT DOCUMENTS

| | | | |
|---|---|---|---|
| 787919 | 6/1968 | Canada | 260/203 |
| 1146604 | 4/1963 | Fed. Rep. of Germany | 260/203 |
| 1156087 | 6/1969 | United Kingdom | 260/203 |

*Primary Examiner*—Floyd D. Higel
*Attorney, Agent, or Firm*—Curtis, Morris & Safford

[57] ABSTRACT

Valuable pigments are obtained by diazotizing 1-aminobenzene-2-(carboxylic acid methyl or ethyl ester)-5-(2',3'-dichloro-anilide) and coupling it onto 1-(2'-hydroxy-3'-naphthoylamino)-4-acetamino-benzene.

The resulting pigments are then subjected to a thermal aftertreatment. These pigments show a high tinctorial strength, a pure shade, a high fastness to migration, especially to overlacquering, to light and weathering and a high heat stability.

3 Claims, No Drawings

MONOAZO COMPOUNDS FROM 1-AMINOBENZENE-2-CARBOXYLIC ACID DERIVATIVES AND THEIR USE AS COLORANTS

The present invention relates to novel monoazo compounds of the formula

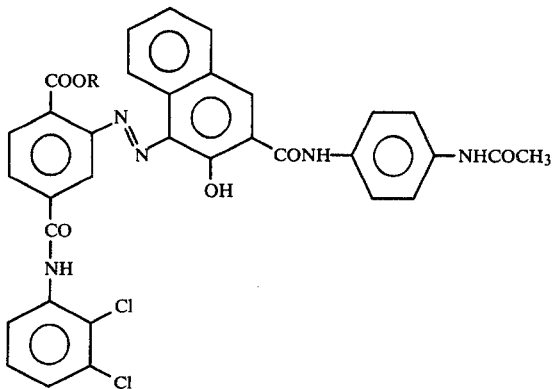

wherein R is the methyl or ethyl group, a process for their preparation, which comprises diazotizing 1-aminobenzenene-2-carboxylic acid methyl ester-5-carboxylic acid-2',3'-dichloroanilide or 1-aminobenzene-2-carboxylic acid ethyl ester-5-carboxylic acid-2',3'-dichloranilide, coupling with 1-(2'-hydroxy-3'-naphthoylamino)-4-acetaminobenzene and preferably heating the still moist product, either in the form of the aqueous suspension obtained or in the form of moist press cake, either in water between about 80° C. and about 150° C. or in a water-soluble or water-insoluble organic solvent between about 80° and about 180° C. or heating the dried untreated product with a water-soluble or water-insoluble organic solvent between about 80° and 180° C. The invention further relates to the use of a novel azo compound as colorants, especially as pigments.

Diazotization can be preformed in an aqueous or organic medium with an alkali metal nitrite or a lower alkyl nitrite and a strong inorganic or organic acid or with nitrosyl sulfuric acid at a temperature −10° to +50° C., preferably −5° to +40° C.

The azo compounds may be prepared by combining the solution of the diazonium compound with the fine dispersion of the coupling component in a slightly acidic medium or by introducing the alkaline solution of the coupling component into the solution of the diazonium compound which has been adjusted to pH 5–6, e.g. by addition of sodium acetate. Another possibility for coupling consists in combining the solutions of the diazonium compound and of the coupling component by introducing them into a buffer mixture preferably consisting of sodium acetate and acetic acid. The temperature during coupling is about −20° to about +80° C., preferably 0°-70° C.

In all these methods the presence of cationic, anionic or non-ionic surfactants may be advantageous.

A further process for preparing the azo compounds consists in carrying out diazotization and coupling in or in the presence or organic solvents or solvent mixtures. There are suitable polar solvents, for example alcohols, especially lower alkanols, such as methanol or ethanol, glacial acetic acid, dioxane, pyridine, dimethylformamide, dimethylsulfoxide, N-methylpyrrolidone or tetramethylene-sulfone.

When operating in pure solvents or solvent mixtures, especially in dipolar aprotic solvents the addition of surfactants is superfluous.

To obtain the optimum pigmentary form with regard to softness of grain, tinctorial strength, (color intensity) hiding (covering) power and dispersibility in lacquers and plastics the mentioned thermal after-treatment is necessary after coupling.

This after-treatment may be effected in the following ways: The aqueous pigment suspension or the moist press cake obtained from the preparation of the pigments may be treated either in water at temperatures of from about 80° to about 150° C., if necessary under pressure, or in an organic solvent at temperatures of from about 80° to about 180° C., if necessary under pressure. The organic solvent used may be soluble or insoluble in water. For example, alkanols having preferably 1 to 6 carbon atoms, lower carboxylic acids, such as formic acid, acetic acid or propionic acid, carboxylic acid alkyl esters, such as acetic acid or propionic acid-(lower alkyl)-esters or benzoic acid methyl or ethyl esters, aromatic hydrocarbons, such as benzene, toluene, xylene, ethyl benzene or cumene, chlorinated aromatic hydrocarbons, such as chlorobenzene, o-dichlorbenzene or bromobenzene, or dipolar aprotic solvents, such as dimethylformamide, dimethylsulfoxide, N-methylpyrrolidone, tetramethylene-sulfone or tetramethyl-urea are useful.

The after-treatment may also be effected by adding the organic solvents mentioned individually or in mixture with one another to the dried untreated pigment at temperatures between about 80° and about 180° C.

If diazotization and coupling is effected in one of the organic or mixtures of solvents mentioned, the thermal after-treatment may expediently be carried out in the same solvent.

The monoazo compounds of the invention are yellowish red powders which are completely insoluble in the usual solvents. They are characterized by a good tinctorial strength, a clear shade, an excellent fastness to over-lacquering and to migration, a very good fastness to light and to weathering and a very good heat stability; thus, they are particularly suitable for the dyeing of plastics such as polyvinyl chloride and especially polyolefins.

The azo compounds of the invention may be used for most different pigment applications, for example for the preparation of printing inks, lacquers and dispersion paints or for the dyeing of rubber, plastics, natural or synthetic resins. The pigments are furthermore suitable for pigment printing on a substrate, especially a textile fibre, as well as on other flat articles such as paper. They may also be used for other purposes, for example, for coloring spun rayon of viscose or cellulose ethers or esters, or polyolefins, polyamides, polyurethanes, polyglycol terephthalate or polacrylnitrile in the spinning mass or for coloring paper.

German Pat. No. 1,146,604 relates to azo pigments of a comparable structure, having good fastness to light. Surprisingly, the monoazo pigments of the invention have a considerably better fastness to light than the pigments known from this Patent.

In the following Examples the temperatures are indicated in °C. The percentages are by weight unless stated otherwise.

EXAMPLE 1

35.9 g of 1-aminobenzene-2-carboxylic acid methyl ester-5-carboxylic acid-2'-3'-dichloroanilide are suspended in 160 ml of glacial acetic acid and stirred with 32 ml of 31% hydrochloric acid. After stirring for one hour, 13.1 ml of 40% aqueous sodium nitrite solution are added dropwise, at 10°–15°, to the suspension, which leads to dissolution of the amine. Stirring is continued for one hour, 300 ml of ice water are added and the excess of nitrite is destroyed with a small amount of amidosulfonic acid.

34.5 g of 1-(2'-hydroxy-3'-naphthoylamino)-4-acetaminobenzene are dissolved in a mixture of 373 g of 33% sodium hydroxide solution and 4500 ml of water, clarified after addition of a clarifying agent (kieselguhr), mixed with 5000 ml of ice water and 20 g of a 10% aqueous solution of an oxethylated stearyl alcohol and then precipitated with 240 ml of glacial acetic acid. The coupling component suspension thus obtained is heated to about 70°. Then the clarified diazonium salt solution described above is added within 45 minutes. Stirring is continued for one hour after coupling, the precipitate is suction-filtered and the press cake is washed free from salt with water.

The purified moist press cake is stirred with water to give a 5% aqueous suspension, and heated for 2 hours in a stirring autoclave for 2 hours to 135°. After cooling to about 50°–60°, the suspension is suction-filtered, washed with water and dried at 60°. The ground pigment represents a brilliant yellowish red powder.

EXAMPLE 2

22.5 ml of nitrosyl sulfuric acid are added dropwise while stirring to 375 ml of dimethylformamide cooled to −5°. Stirring is continued for 15 minutes and then 42.5 g of solid 1-aminobenzene-2-carboxylic acid methyl ester-5-carboxylic acid-2',3'- dichloroanilide are added. The temperature is maintained at 0° and stirring is continued for one hour.

43.5 g of 1-(2'-hydroxy-3'-naphthoylamino(-4-acetamino benzene are dissolved in 600 ml of dimethylformamide. After cooling to 0° the diazonium salt solution obtained above is added dropwise while stirring within 15 minutes. 50 ml of pyridine are added. Stirring is continued for 2 hours without cooling. Then the suspension is heated in a pressure vessel to 140° and maintained for 5 hours at this temperature.

After cooling, suction-filtering, washing with dimethylformamide, ethanol and water, and drying, the pigment is obtained as described in Example 1.

EXAMPLE 3

17.65 g of 1-aminobenzene-2-carboxylic acid ethyl ester-5-carboxylic acid-2',3'-dichloroanilide are stirred for 30 minutes in a mixture of 100 ml of glacial acetic acid and 15 ml of 31% sulfuric acid. At 10°, 10 ml of a 5 N sodium nitrite solution are added dropwise, and stirring is continued for 30 minutes with an excess of nitrite. Then 100 ml of ice water and 2 g of kieselguhr are added, and the diazonium salt solution is clarified.

17.3 g of 1-(2'-hydroxy-3'-naphthoylamino)-4-acetamino benzene are dissolved in a mixture of 185 g of 33% sodium hydroxide solution and 2000 ml of water, clarified after addition of a small amount of kieselguhr, mixed with 2500 ml of ice water and 10 g of a 10% aqueous solution of an oxethylated stearyl alcohol and then precipitated with 120 ml of glacial acetic acid.

The coupling component suspension thus obtained is heated to about 70°. Then the above-mentioned diazonium salt solution adjusted to a volume of 500 ml is added within 30 minutes. After coupling stirring is continued for one hour, then the suspension is suction-filtered and the press cake is washed free from salt with water. The moist press cake is then stirred with water to obtain a 5% aqueous pigment suspension and heated in a stirring autoclave for 3 hours to 135°. After cooling to 50°–60° the suspension is suction-filtered, washed with water and dried at 60°. The ground pigment is a brilliant orange red powder.

EXAMPLE 4

If the reaction is carried out as indicated in Example 2, but instead of 42.5 g of 1-aminobenzene-2-carboxylic acid methyl ester-5-carboxylic acid-2',3'-dichloroanilide 44.1 g of 1-aminobenzene-2-carboxylic acid ethyl ester-5-carboxylic acid-2'-3'-dichloroanilide are used, the azo pigment is obtained according to Example 3.

I claim:
1. A compound of the formula

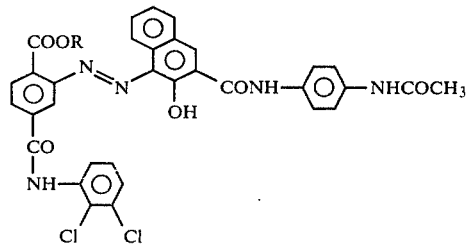

in which R is methyl or ethyl.
2. The compound as claimed in claim 1, wherein R is methyl.
3. The compound as claimed in claim 1, wherein R is ethyl.